(No Model.) 2 Sheets—Sheet 1.
C. C. BALSTON.
COMBINED PLATE HOLDER AND RECEIVER.
No. 413,474. Patented Oct. 22, 1889.
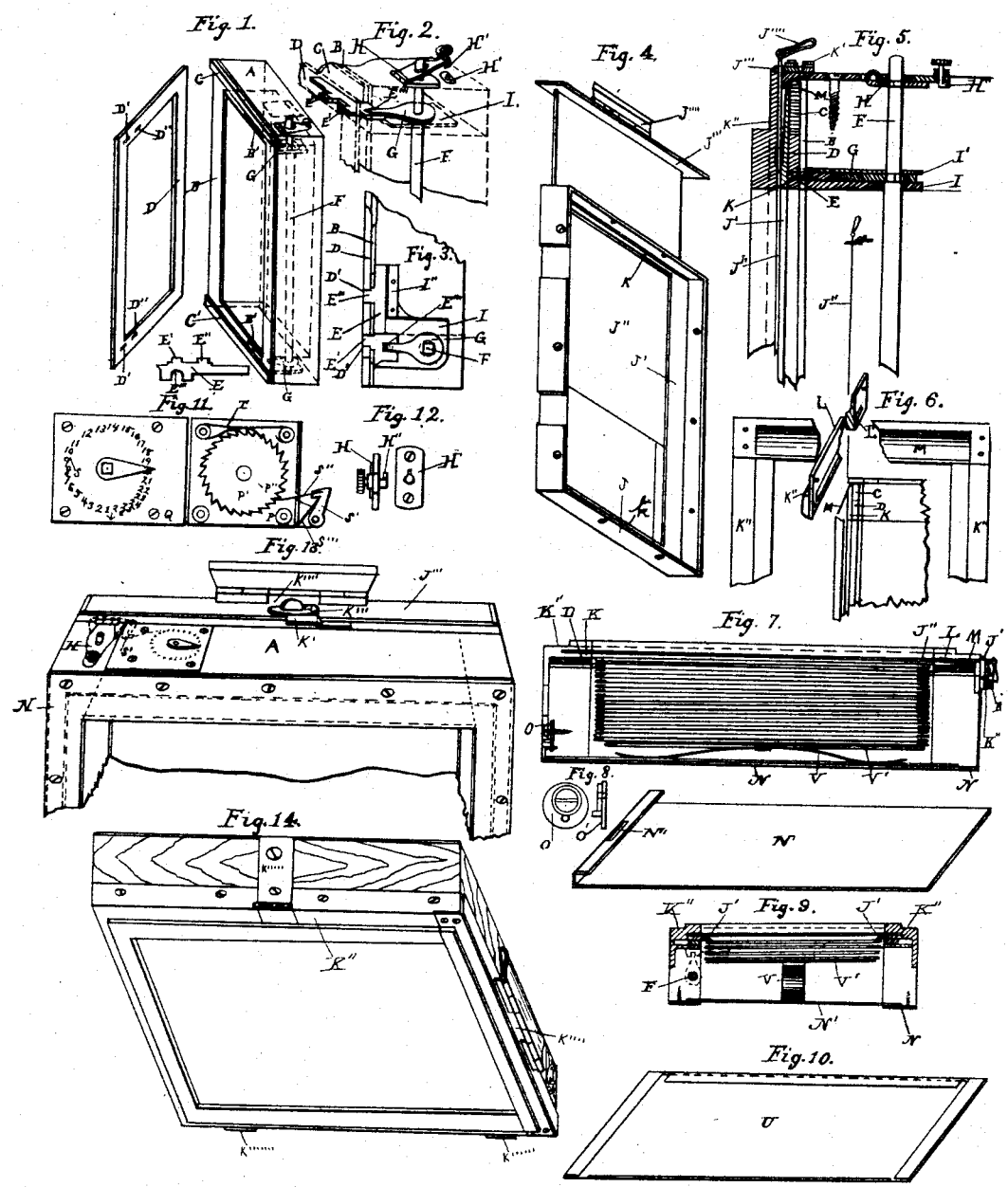
Witnesses:
Herman Gustow
W. C. Matthis
Inventor:
Clyde C. Balston,
By his Atty.
Chas. C. Gill (No Model.) 2 Sheets—Sheet 2.
C. C. BALSTON.
COMBINED PLATE HOLDER AND RECEIVER.
No. 413,474. Patented Oct. 22, 1889.
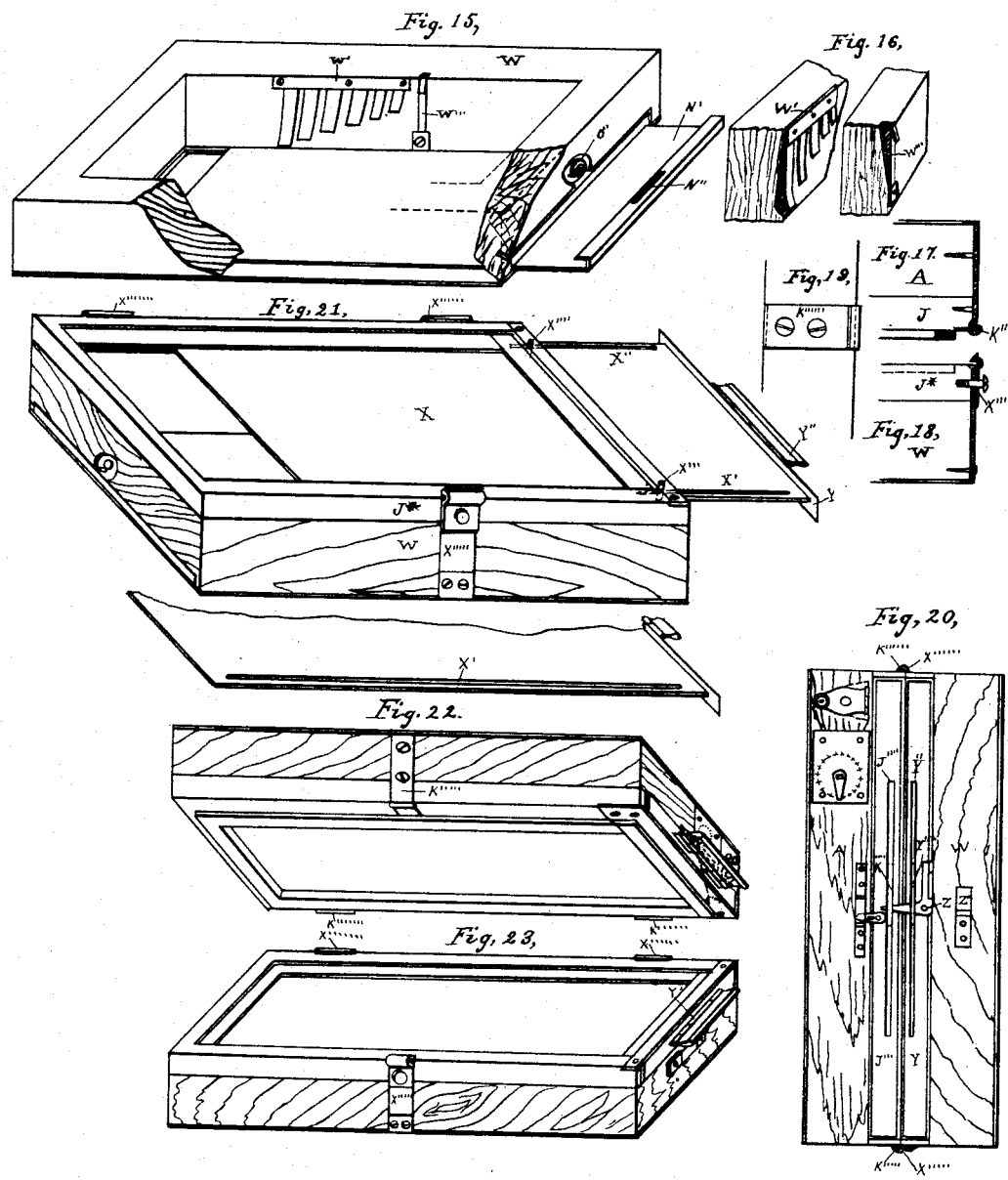
Witnesses:
Herman Gustow.
W. A. C. Matthis
Inventor:
Clyde C. Balston,
By his Attorney,
Chas. C. Gill

UNITED STATES PATENT OFFICE.

CLYDE C. BALSTON, OF BROOKLYN, NEW YORK.

COMBINED PLATE HOLDER AND RECEIVER.

SPECIFICATION forming part of Letters Patent No. 413,474, dated October 22, 1889.

Application filed March 29, 1889. Serial No. 305,283. (No model.)

*To all whom it may concern:*

Be it known that I, CLYDE C. BALSTON, a citizen of the United States, and a resident of Brooklyn, in the county of Kings and State of New York, have invented certain new and useful Improvements in Combined Plate Holder and Receiver, of which the following is a specification.

My invention relates to a new and improved apparatus for use in the art of photography, and more especially to that part of the device known as the "plate or film holder and receiver," the object of my invention being, first, to provide a combined holder and receiver whereby the plates may be easily and readily transferred from the former to the latter without danger of injury to the said plates or films; secondly, to provide a combined holder and receiver adapted to hold a large number of films or plates; thirdly, to provide a device of the above-mentioned character which shall be compact in size and simple in its construction and operation.

With these ends in view my invention consists in certain construction and arrangements of parts and combinations of parts, as hereinafter described, and pointed out in the claims.

In the accompanying drawings, Figure 1 is a view in perspective of the frames and sliding pin constituting a portion of the plate or film holder. Fig. 2 is an enlarged perspective view of the upper right-hand corner of the frame shown in Fig. 1, and showing the shifting and locking devices for the movable frame. Fig. 3 is a plan view showing a portion of the holding and sliding frames with the sliding pin in position. Fig. 4 is a perspective view of a frame and slide adapted to fit over the frames shown in Fig. 1. Fig. 5 is a view in cross-section of the upper part of the holder, showing the relative positions of the frames shown in the preceding figures. Fig. 6 represents front and cross-section views showing the arrangement of a ribbon-spring to exclude the light. Fig. 7 is a view in cross-section of a portion of the holder containing plate-carriers, and also a detached view in perspective of the rear plate or slide. Fig. 8 is a view of an eccentric-catch adapted to secure the rear slide or plate of the holder. Fig. 9 is a view in horizontal cross-section of the holder, showing the plate-carriers resting against flanges on the frame shown in Fig. 4. Fig. 10 is a perspective view of a plate-carrier. Fig. 11 is a view showing a ratchet and recording-dial. Fig. 12 is a view showing construction of locking device for the shifting rod and frame, shown detached in Fig. 1. Fig. 13 is a perspective view of upper surface of holder, showing the position of the recording-dial thereon. Fig. 14 is a perspective view of finished holder. Fig. 15 is a perspective view of the interior of the receiver. Fig. 16 is a view showing springs placed on the inner side of the receiver. Figs. 17, 18, and 19 are views showing spring-catches for securing the holder and receiver together. Fig. 20 is a top plan view showing the receiver and holder locked together. Fig. 21 is a perspective view of the completed receiver with slide partly open. Figs. 22 and 23 are views showing manner of placing them in position to be joined together.

A represents a wooden frame, having secured to its front face or edge a frame B, preferably constructed of metal or vulcanized rubber, the inner and outer surfaces of said latter frame being made flush with those of the wooden frame A.

Near the upper and lower right-hand corners, Fig. 1, of the frame B are formed elongated slots B' B', and on the outer face of said frame are secured two metal strips C C', which, as will be hereinafter explained, serve as guides to the sliding frame D. This frame is preferably constructed of metal, and of such dimensions as to nicely fit between the metal strips C C', and is provided with slots D' D'', which, when the frame is in position, register with the slots B' B'. In the slots B' B' fit sliding keys E, constructed as shown in Fig. 1, and having projections E' E'' on one side adapted to fit in the slots D' D'', and on the opposite side an indenture E''', into which latter, when the several parts are placed in position, fits one end of a key G, Figs. 2 and 3, the opposite end of the key being mortised or otherwise secured to a vertical rod F, extending through the frame A. To the upper end of the rod F is secured a lock or catch H, constructed in the form of a hinge, through both leaves of which extends the rod F, the lower leaf being rigidly secured thereto, and the upper leaf constructed with a slot, through which said rod loosely extends. In the end of the upper leaf of the hinge fits a button H, the shank or stem H'' of which is adapted to engage with the plate H', Figs. 2 and 12, and prevent the rod F from turning or revolving. The pins E and keys G are placed between metal plates I I', Figs. 3 and 5, the plate I, Fig. 3, being provided with a strip I'', for guiding the pin E in its lateral movements.

J represents a frame made of metal, vulcanized rubber, or other suitable material, and constructed to fit over frames A D, and provided with upper slotted flange K, lower flange $k$, and side flanges J', the flanges K and $k$ being flush with inner side of frame D. In the slots fits a metal slide J'', provided on its upper side with a cap or strip J''' for excluding light, the latter having secured thereon the hinge J'''' for raising said slide. It will be seen that the flanges K serve to guide the slide J'' in its vertical movements, and also as guides for the sliding frame D in its lateral movements, and that the flanges J' also serve to guide the slide J'' and frame D and as a rest for plate or film holders, as shown in Fig. 9 of the drawings. The frame J is formed with a rabbet K'' on its outer surface adapted to fit within a recess formed in the receiver. To the strip C is secured a steel ribbon-spring M, passing through the slot in the flange K, Figs. 5, 6, and 7, the lower end of the spring pressing against the slide J'' when the latter is lowered and into a groove L', formed in the strip L, Fig. 6, secured to the front of the frame J, when the slide is raised or removed. By these means all light is excluded from the holder when said slide J'' is removed therefrom.

The frame A is constructed with a shallow rabbet, in which is fitted a metal frame N, Figs. 7 and 9, adapted to receive the rear plate or slide N'. As shown in Fig. 7, the lower edge of this slide is turned over and provided with a slot N''. To the under side of frame A is secured an eccentric-catch O, which when turned enters the slot N'' in the slide N', and locks the latter in its position within the recess or rabbet formed in the frame A and covered by metal frame N. To the upper side of the frame A is attached a recording-dial constructed of two plates P Q, Fig. 11, between which is located a ratchet P', pinioned to the shaft P'', journaled in said plates. To the upper end of the shaft is secured a hand or pointer R, moving over a dial S on the surface of the plate Q. To a projection on the under plate P is secured a pawl S', against which presses one end of the spring S''', the opposite end of the latter being secured around one of the flanges formed in the four corners of the plates for the reception of screws to hold the plates in position. The end of the pawl S' is provided with a spring S'', engaging with the teeth of the ratchet P'.

To the flanges formed around two other of the screw-holes is secured the spring-dog T, the free end thereof engaging with the teeth of the ratchet P' to hold the latter in its several adjustments. To the upper side of the frame A is also secured a bent catch K', under which is turned the locking-piece K''', when it is desired to prevent the slide J'' from being raised.

Fig. 10 shows a film or plate carrier U turned up and over on three of its sides and slightly on the fourth, and preferably formed of thin sheet metal. These plates, arranged in a series or pile within the holder, are held in position against each other, the front plate resting between the sides of the sliding frame D and bearing against the flanges J' of the frame J by means of a spring V, which presses against the rear slide N', and fastened to a plate V', pressing against the rear plate of the pile.

The second part of the apparatus consists of a receiver for receiving exposed plates or films. It is constructed with a wooden frame W, to the inner side of which is secured a metal strip W', turned over on its upper edge and having its lower part cut into ribbon-springs, slightly curved toward the center of the receiver, and adapted to prevent the contained plates from shaking. A spring W''' serves the same purpose, being secured to the frame at its lower end and its upper free end turned over. Behind this spring and spring W' the wall of the receiver is slightly cut away, as shown in Fig. 16, to allow the springs to rest therein. The rear of the receiver is closed by a metal slide N', similar to that closing the receiver, and locked with a similar catch O'.

To the front face of the frame W is secured a frame J*, provided with the slide X, having longitudinal slots X' X'' near its outer edges, in which slots fit the ends of pins X''' X'''', extending down through the frame J*, and which pins prevent the slide from being entirely removed from the frame. Spring-catches X''''' X'''''' X''''''' and K''''' K'''''' K''''''' are secured to the sides of the receiver and holder, respectively, which, when the parts are brought together, interlock, as shown in Figs. 17, 18, 19, and 20. A hook or catch Z is pivoted to the cap Y of the slide X, which engages with the bent metal strip Z', to prevent said slide from being accidentally raised.

Having described the detailed construction of my improved device, I will now set forth the *modus operandi*.

After a plate has been exposed and it is desired to transfer it from the holder to the receiver the two parts are secured together by the interlocking of the spring-catches, as before described. The catch Z is then turned until its end projects through slots K'''' Y', formed in the hinges J'''' Y'', respectively, whereupon the slides J'' X are raised until stopped by the pins X''' X''''. The catch H is then disengaged and after the upper leaf has been raised is turned to the left, which revolves the rod F, which in turn, through the medium of the keys G and sliding pins E, moves the sliding frame D to the right. The front plate-carrier, which, as before described, is always located within the walls of the sliding frame D, is moved with said latter frame to the right and carried beyond the inner edge of the flange J' on the left-hand side of the frame J, and by means of the spring V is pushed out toward the receiver. By turning the catch H in the opposite direction the other edge of the plate-carrier is released and said carrier allowed to fall into the receiver, where it is held stationary by the springs W' W'''. When the catch H is turned to the left, it comes in contact with the pawl S, moving it in the opposite direction, which turns the ratchet P' around one notch, and by means of the shaft P'' turns the pointer or hand R, thereby indicating on the dial S the number of plates transferred to the receiver. The slides being returned to their original positions and the parts separated, another plate may be exposed, the above operations being repeated until the indicator shows that all of the plates have been used.

What I claim as my invention, and desire to secure by Letters Patent, is—

1. The combination, with a holder, of a detachable receiver secured thereto, a sliding frame for transferring the plates, and an automatically-operating recorder indirectly connected with the latter, substantially as set forth.

2. A plate or film holder constructed with a containing-frame, a sliding frame, and a rotating shaft indirectly connected with said sliding frame for the purpose of moving the same and releasing the plates from said containing-frame, substantially as set forth.

3. A plate or film holder constructed with a containing-frame, a sliding frame, a rotating shaft indirectly secured to the latter, and a recorder connected with said shaft, substantially as and for the purposes set forth.

4. The combination, with a holder, of a receiver removably secured thereto, a rotating shaft extending through said holder and having attached thereto a sliding frame for releasing the plates, and a recorder secured to the holder and connected with said shaft for automatically recording the number of plates transferred from said holder to the receiver.

5. In a plate or film holder, the combination of a containing-frame, a sliding frame moving thereon, sliding pins E, connected with said sliding frame, and rotating rod F, connected with said pins for imparting a reciprocating motion to said sliding frame, substantially as and for the purposes set forth.

6. In a plate or film holder, the combination, with the frames A B D, of the pins E, rod F, and keys G, all arranged and constructed to operate in the manner and for the purposes set forth.

7. In a plate or film holder, the combination, with a containing-frame, of a sliding frame, a rotating rod connected with the latter, a ratchet and pawl connected with said rod, and a recording-dial connected with said ratchet, substantially as and for the purposes set forth.

8. In a plate or film holder, the combination, with the frames A B D, of the rod F, indirectly connected with frame D for moving it laterally, and a recorder consisting of plates P Q, ratchet P', shaft P'', pawl S', and pointer R, substantially as and for the purposes set forth.

9. A plate or film holder constructed with a containing-frame, a sliding frame, frame J, and a spring for holding the front plate in position within the sliding frame and against the frame J, substantially as and for the purposes set forth.

10. In a plate or film holder, the combination, with a containing-frame, of a sliding frame, a rotating rod connected with said latter frame, and a turning and locking device H, for moving the rod and sliding frame and locking them in position, substantially as and for the purposes set forth.

11. A plate or film holder constructed with the frames A B D, frame J, carrying slide J'', and spring M, for excluding light when the said slide is withdrawn, substantially as and for the purposes set forth.

12. A plate or film holder constructed with frame A, frame B, provided with slots B', frame D, provided with slots D' D'', pins E, fitting in said slots B' D' D'', keys G, and rod F, connected with said pins, substantially as and for the purposes set forth.

13. In a plate or film holder, the combination, with frame A and sliding frame D, of the rod F, indirectly connected with said sliding frame, turning and locking device H, connected with said rod, and automatic recorder, connected also with said rod, substantially as set forth.

14. A plate or film holder constructed with frame A, frame B, sliding frame D, and frame J, carrying the slide J'', and constructed with flanges J', serving as rests for the plates or films and as guides for said slide, substantially as and for the purposes set forth.

15. In a plate or film holder, the combination of frames A, B, D, and J, the latter being provided with a grooved removable piece or strip L and a spring M, all arranged substantially as set forth.

16. In a plate or film holder, the combination, with frames A, B, D, and J, of a plate or plates contained within the holder and bearing against flanges formed on frame J, a spring V, for holding them in position, and a receiver removably secured to the holder, substantially as and for the purposes set forth.

17. In a combined holder and receiver, the receiver constructed with the frames W J and slides X N', substantially as set forth.

18. A receiver constructed with frames W J, slides X N', and having springs W' W''', secured to inner side of frame W, substantially as set forth.

19. The combination, with a holder having slide J″, provided with cap J‴ and slotted hinge J⁗, of a receiver having slide X, provided with a cap Y, slotted hinge Y″, and catch Z, substantially as set forth.

Signed at New York, in the county of New York and State of New York, this 27th day of March, A. D. 1889.

CLYDE C. BALSTON.

Witnesses:
CHAS. C. GILL,
W. A. C. MATTHEI.